United States Patent Office 3,127,233
Patented Mar. 31, 1964

3,127,233
MILD ALKALINE OXIDATION TREATMENT OF ACRYLONITRILE POLYMER FIBERS OR FILMS, TO IMPROVE FLEXIBILITY AND DYEABILITY
Fred J. Lowes, Midland, Mich., assignor to The Dow Chemical Company, Midland, Mich., a corporation of Delaware
No Drawing. Filed May 29, 1961, Ser. No. 113,117
6 Claims. (Cl. 8—111)

This invention relates to a method for treating polymeric articles such as fibers and films consisting essentially of a linear polymer of which at least 80 percent of the repeating units are those of acrylonitrile, to improve the wet flexibility and the dyeability thereof.

It is well known that homopolymeric acrylonitrile and the linear copolymers of at least 80 percent acrylonitrile with other monoethylenic polymerizable substances are highly hydrophobic, and that fibers made from them are less easily dyed than most other fibers, whether natural or synthetic. The principal reason for using copolymers of acrylonitrile instead of the homopolymer has been that chemically active, dye receptive groups can be incorporated in a copolymer. Even so, the products are hydrophobic and dyeing has required special techniques or has been possible only with special dyes. In short, there remains room for further improvement. It would be desirable to provide a simple treatment capable of rendering less hydrophobic, more flexible and more readily dyeable articles such as filaments and films, having large surface area relative to thickness (or diameter), which are composed of the homopolymer or a linear copolymer of acrylonitrile which normally has the characteristics of polyacrylonitrile. It is the principal object of this invention to provide such a treatment.

The treatment of the present invention, whereby the foregoing and related objects are attained, is a method in which a normally hydrophobic polymeric article, such as a fiber or film, at least 80 percent of the repeating units of which are

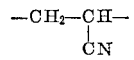

is exposed to the action of an aqueous alkaline mild oxidizing agent which is preferably free from color forming polyvalent metal ions, at a temperature at which the aqueous treating solution is liquid, and for a time, inversely related to the temperature employed, varying from about 3 to 5 minutes at the boil to about 1 to 4 hours or more at room temperature.

The treatment may be applied to any article made of the predominantly acrylonitrile polymeric materials, as it renders the surfaces of such articles less hydrophobic and more readily dyeable. It is of special benefit to those thin articles such as fibers and films, as it provides such articles additionally with improved flexibility. The greatest problem exists, and the greatest benefit is realized from the treatment, with the homopolymer of acrylonitrile. The copolymers of acrylonitrile with up to 20 percent of one or a plurality of other monoethylenic monomers, as is known in the art, share the principal characteristics of polyacrylonitrile. By way of illustration, but not of limitation, such known copolymers include those in which acrylonitrile is copolymerized with a minor (not exceeding 20 percent in the aggregate) proportion of one or a mixture of vinyl acetate, methyl acrylate, methacrylonitrile, acrylamide, methacrylamide, allyl alcohol, acrylic acid, itaconic acid, fumaronitrile, 2-vinylpyridine, ethylene sulfonic acid and its alkali metal salts, vinylbenzene sulfonic acid and its alkali metal salts, the vinyl lactams such as vinyl caprolactam, maleic anhydride, and others known in the art. Not all such copolymers are as hydrophobic or as difficult to dye as is the homopolymer, but they all can be improved further by the method of the present invention.

The aqueous alkaline mild oxidizing agent useful in the invention should ordinarily, and for greatest utility of the treated product, be substantially free from discoloring metal ions, especially those of colored polyvalent metal ions which might form chelates with and become bound to the polymer. The most economical agents to use have as the only metal ions present the colorless alkali metal or alkaline earth metal ions. The alkalinity of the aqueous oxidizing agent is preferably provided by sodium or potassium hydroxide. The oxidizer is preferably a peroxide or a hypochlorite, illustratively hydrogen peroxide or sodium hypochlorite or calcium hypochlorite or hypochlorite-chloride. The concentration of alkali in the treating solution should not be significantly over 2.5 Normal, as much higher concentrations lead to different results. Concentrations of sodium hydroxide or of potassium hydroxide in the treating solution ranging from about 0.2 percent to about 10 percent, by weight, are quite satisfactory. The concentration of hydrogen peroxide or of hypochlorite used as the mild oxidizer is not critical, but is conveniently in the range from about 1.5 percent to 10 percent of the weight of solution.

While the invention is not limited to the treatment of foils, fibers and similarly thin, flexible articles, it finds particular advantage with such materials. It is applicable to such articles regardless of the manner in which they were prepared. Thus, films or sheets may be treated which were produced by molding or extrusion, or by being cast from solution or emulsion, or by being coagulated from solution by contact with a non-solvent for the polymer which is miscible with the solvent. Similarly, fibers and filaments may be treated which have been wet spun or dry spun from organic solvents or have been wet spun from known, aqueous strong salt solutions and thus coagulated as filamentary aquagel, as is known in the art. When films or filaments are first formed as an aquagel, the present treatment may be applied while the gel condition is retained, or it may be applied after the article has been so thoroughly dried as irreversibly to destroy the aquagel condition.

Many of the known methods of aqueously processing polymers of acrylonitrile seem to result in a tendency for the polymeric product to turn yellow when heated. This tendency, apparently related to the generation in the polymer molecule of randomly distributed amide groups, can be avoided by means of the present treatment.

In one illustration of the practice of the invention, an alkyline solution of hydrogen peroxide was prepared by dissolving 0.2 gram KOH in each 100 ml. of aqueous 3 percent hydrogen peroxide. Several samples of polyacrylonitrile aquagel, 0.01 inch thick, were immersed in the alkaline peroxide at 26°–27° C. Samples were removed periodically, rinsed with water, and dried to destroy the aquagel condition. The so-dried samples were then immersed in water and their wet flexibility was evaluated qualitatively. Each sample was then subjected to a standard dyeing procedure, using Irgalan Blue GL, an acid dye (Colour Index Acid Blue 166), and the color yields were compared, as were the depths of penetration of the dye.

Table 1

| Immersion Time, hours | Wet Flexibility | Penetration of dye |
|---|---|---|
| 0.25 | No swelling; some brittleness | None. |
| 1.0 | Slight swelling; less brittle | Some; incomplete. |
| 4 | Swells, flexible | Thorough. |
| 8 | -----do----- | Do. |
| 24 | -----do----- | Do. |

Using treating solutions like those in the preceding example, other samples of the same polymer aquagel were immersed for the times and at the temperatures given in Table 2. The samples were removed, washed, dried irreversibly, and subjected to dyeing as described above.

Table 2

| Temp., °C. | Time, Hours | Wet Flexibility | Penetration of dye |
|---|---|---|---|
| 35 | 2 | Swells; flexible | Thorough. |
| 35 | 1 | Sl. Swelling; flexible | Incomplete. |
| 35 | 0.5 | Sl. Swelling; Sl. Brittle | Do. |
| 50 | 0.5 | Swells; flexible | Thorough. |
| 50 | 0.25 | -----do----- | Do. |
| 70 | 0.25 | -----do----- | Do. |
| 70 | 0.10 | -----do----- | Do. |
| 90 | 0.10 | -----do----- | Do. |
| 90 | 0.05 | -----do----- | Do. |

An alkyline hypochlorite solution was prepared by dissolving 100 grams of NaOH in water, diluting to one liter, and bubbling chlorine into the solution until the weight had increased by 71 grams. The resulting solution contained about one gram mole of NaOCl and about 0.5 gram mole of free NaOH per liter. This aqueous alkaline mild oxidizing agent was used in place of the alkaline hydrogen peroxide of the previously reported tests, to treat samples of polyacrylonitrile, both as aquagel and as previously dried filaments. In each case, the treated product, after exposures like those reported above, and when washed and dried, was found to have wet flexibility, and to be more receptive to dyes than is the normal hydrophobic polyacrylonitrile.

An aqueously processed polyacrylonitrile which had been polymerized in and wet spun from 60 percent zinc chloride solution, in the form of continuous filament tow, turned unacceptably yellow when heated for an hour in an oven at 140° C. Another specimen of the same tow was immersed for one hour in aqueous sodium hypochlorite (5% available chlorine) at room temperature, rinsed with water, and exposed for the same time to the same temperature in the same oven without discoloration.

In addition to the benefits previously mentioned, the polymeric products treated in accordance with the invention have less tendency to acquire and retain charges of static electricity than do similar but untreated hydrophobic polymeric articles whereof 80 percent or more of the polymer chain is made up of the recurring

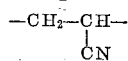

units.

I claim:
1. The method which comprises (1) immersing an article consisting essentially of a linear polymer of which at least 80 percent of the recurring units are

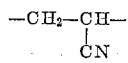

the remainder being at least one other ethylenic substance which is copolymerizable with acrylonitrile, and which article when dried is normally hydrophobic, in a bath of a liquid aqueous alkaline mild oxidizing agent composed essentially of (a) from about 0.2 to 10 percent of an alkali metal hydroxide and (b) from about 1.5 to 10 percent of hydrogen peroxide, said article being immersed in said bath for a time, inversely related to the temperature, varying from about 3 to 5 minutes near the boiling temperature to from 1 to about 4 hours at room temperature, but at least for a time sufficient to provide an article which when washed and dried exhibits swelling in water, and (2) washing the article to remove the alkaline agent.

2. The method claimed in claim 1, wherein the normally hydrophobic article is a thin, flexible article from the class consisting of foils and filaments.

3. The method claimed in claim 2, wherein the article immersed in the alkaline oxidizing medium is in the aquagel condition at the time of such treatment.

4. The method claimed in claim 1, wherein the normally hydrophobic article is composed of polyacrylonitrile.

5. The method claimed in claim 1, wherein said alkali metal hydroxide is potassium hydroxide.

6. The method claimed in claim 1, wherein said alkali metal hydroxide is sodium hydroxide.

References Cited in the file of this patent

UNITED STATES PATENTS

| 2,432,448 | Richards | Dec. 9, 1947 |
| 2,641,524 | Chaney et al. | June 9, 1953 |
| 3,056,645 | Anderson et al. | Oct. 2, 1962 |